UNITED STATES PATENT OFFICE.

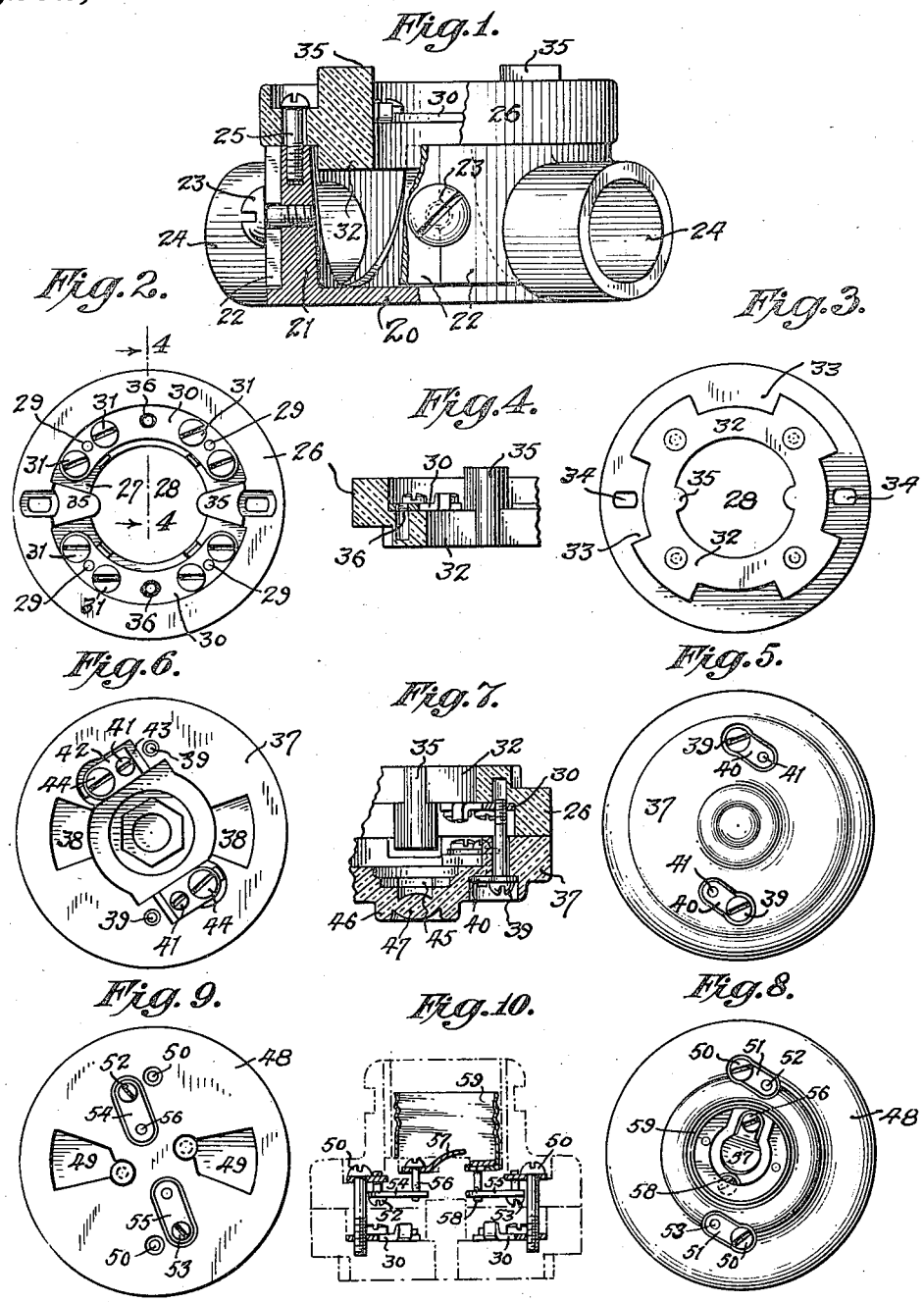
G. B. THOMAS.
OUTLET BOX FITTING.
APPLICATION FILED APR. 16, 1918.
1,282,493.
Patented Oct. 22, 1918.
Inventor:
George B. Thomas
by Howson and Howson Attys.

GEORGE B. THOMAS, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

OUTLET-BOX FITTING.

1,282,493.

Specification of Letters Patent.    Patented Oct. 22, 1918.

Application filed April 16, 1918.   Serial No. 228,819.

*To all whom it may concern:*

Be it known that I, GEORGE B. THOMAS, a citizen of the United States of America, residing at Bridgeport, in the county of Fairfield and State of Connecticut, have invented certain new and useful Improvements in Outlet-Box Fittings, of which the following is a specification.

My invention relates to outlet box fittings and particularly to a connection block adapted to be associated with any one of a series of outlet fittings, the object of my invention being to provide a structure of improved type having the peculiarities and advantages hereinafter described or shown in the accompanying drawing, in which—

Figure 1 is a broken side elevation of an outlet box and associated connection block;

Fig. 2 is a top plan of the connection block alone;

Fig. 3 is an inverted plan of the latter;

Fig. 4 is a cross section on the line 4—4, Fig. 2;

Fig. 5 is a plan view of a rosette adapted to fit and coöperate with the connection block;

Fig. 6 is an inverted plan thereof;

Fig. 7 is a partial vertical section therethrough showing the rosette assembled on the connection block;

Fig. 8 is a plan view of a lamp socket adapted to coöperate with the connection block;

Fig. 9 is an inverted plan thereof;

Fig. 10 is a sectional elevation of the metal parts of the socket and connection block, the porcelain elements of which are indicated in broken lines.

The outlet box here illustrated is of the Adapti type, comprising a base 20 with four upstanding, segmental posts 21, to which the wall sections 22 are secured by the overlapping heads of the lateral screws 23. The wall sections 22 are in the form of quadrants, certain of which carry bosses 24 adapted to receive the ends of wire conduits. The posts 21 are also tapped at their upper ends to receive securing screws 25, by which an ordinary cover plate (not shown) may be secured in position, or which may be utilized, as in the present instance, to hold thereon an electric fitting.

The fitting shown in Figs. 1 to 4 is a connection block 26, of generally known form, comprising an annulus of insulating material, such as porcelain, having a ledge 27 surrounding its central aperture 28, on opposite sides of which are secured, by screws 29, the bus bars 30. Series of binding screws 31 carried by each bus bar, afford means for readily making connection between the wires of the main and branch lines. In the present construction, I have modified the usual connection block of this type by providing on its lower face, a generally circular boss 32, which fits within the sides 22 of the outlet box and is provided, at suitable intervals, with bays 33 to accommodate the posts 21 of the outlet box base 20. Piercing the connection block at a mid point in two opposite bays 33, are holes 34 which permit the passage therethrough of the securing screws 25. It will be noted that these opposite bays 33, engaging the sides of the posts 21, serve to properly position the connection block on the outlet box, so that the holes 34 register with the holes in the tops of the posts 21, and thus locate the latter for the securing screws 25. A pair of ribs 35 projecting slightly into the hole 28 of the connection block from opposite sides, divide the ledge 27 into two arcs, one for each bus bar 30. These ribs extend from the bottom of the boss 32 to a point above the top of the connection block, so that the projecting upper ends of these ribs 35 form studs which serve as means for properly locating a coöperating fitting with relation to the connection block. In order to establish electrical and mechanical connection between the connection block and the coöperating fitting, the bus bars 30 are tapped at 36 to receive a connecting screw.

As an example of such a coöperating outlet fitting, I have illustrated in Figs. 5, 6, and 7, a rosette. The latter comprises an insulating body 37 of substantially the same diameter as the connection block and having in its juxtaposed face a pair of recesses 38 adapted to receive the stud-like ends of the ribs 35 on the connection block. In adjusted position on the connection block, the tapped holes 36 in the bus bars 30 register with screws 39 carried by the rosette and passing therethrough from the outer face thereof. Beneath the head of each screw 39 is a strap 40 connected by a screw 41 with a strap 42 resting in a ledge 43 formed on the inner face of the rosette. This strap 42 carries a binding screw 44, to which the bared end of a wire of the pendant cable (not shown) may be attached. The cable hole 45 through the neck 46 of the rosette may be temporarily closed by a knock-out diaphragm 47. It will be observed that the screw 39 not only electrically connects the terminal plate 42 to its bus bar 30, but mechanically secures the rosette in position upon the connection block.

Interchangeably coöperating with the connection block, various other outlet fittings may be provided, and I have shown in Figs. 8, 9, and 10, for the sake of illustration, such another fitting in the form of a lamp socket. This socket comprises a base 48 of insulating material, similarly provided, on its juxtaposed face, with opposite recesses 49 to receive the stud ends of the ribs 35, thus locating the socket properly with relation to the connection block. In this position, screws 50, carried by the socket and piercing the body thereof, register with the tapped holes 36 in the bus bars 30 and afford means for mechanically holding the socket in position and electrically connecting its outlet terminals to the bus bars. Thus, each screw 50 overlies a strap 51, which, in turn, is engaged by a screw 52 or 53 passing up through the base of the socket and establishing connection with the straps 54—55. The strap 54 is in turn engaged by the screw 56, which overlies the base of the center contact 57 of the socket. The strap 55 is engaged by the screw 58 which passes through the base flange of the screw shell contact 59. The circuit from the bus bars 30 is thus established through the socket terminals.

Various other outlet fittings can readily be provided to coöperate with the connection block 26, and I do not limit the series of coöperating fittings to the rosette and socket outlets illustrated. Various modifications in details of arrangement and construction will readily occur to those skilled in the art, which do not depart from what I claim as my invention.

I claim:—

1. A fitting for an outlet box having upstanding posts and box wall sections surrounding said posts and secured thereto, said fitting comprising an insulating base adapted to rest upon the wall of the box, a boss on said base projecting into the box and provided with bays to accommodate the posts of the box wall, said base being pierced at opposite bays to permit securing screws to pass therethrough into said posts, and having a central wiring aperture together with ledges on opposite sides of said aperture, and bus bars secured on said ledges and a plurality of wire terminal binding screws carried by each bus bar.

2. A fitting for an outlet box having upstanding posts and box wall sections surrounding said posts and secured thereto, said fitting comprising an insulating base adapted to rest upon the wall of the box, a boss on said base projecting into the box and provided with bays to accommodate the posts of the box wall, said base being pierced at opposite bays to permit securing screws to pass therethrough into said posts, and having a central wiring aperture together with ledges on opposite sides of said aperture, and bus bars secured on said ledges and a plurality of wire terminal binding screws carried by each bus bar, and ribs on said base spacing the ends of said bus bars apart and projecting above the upper surface of said base to form positioning studs for a coöperating outlet fitting.

3. A fitting for an outlet box having upstanding posts and box wall sections surrounding said posts and secured thereto, said fitting comprising an insulating base adapted to rest upon the wall of the box, a boss on said base projecting into the box and provided with bays to accommodate the posts of the box wall, said base being pierced at opposite bays to permit securing screws to pass therethrough into said posts, and having a central wiring aperture together with ledges on opposite sides of said aperture, and bus bars secured on said ledges and a plurality of wire terminal binding screws carried by each bus bar, and ribs on said base spacing the ends of said bus bars apart and projecting above the upper surface of said base to form positioning studs for a coöperating outlet fitting, in combination with a coöperating fitting adapted to rest upon said base and having recesses in its juxtaposed face to receive said positioning studs.

4. A fitting for an outlet box having upstanding posts and box wall sections surrounding said posts and secured thereto, said fitting comprising an insulating base adapted to rest upon the wall of the box, a boss on said base projecting into the box and provided with bays to accommodate the posts of the box wall, said base being pierced at opposite bays to permit securing screws to pass therethrough into said posts, and having a central wiring aperture together with ledges on opposite sides of said aperture, and bus bars secured on said ledges and a plurality of wire terminal binding screws carried by each bus bar, and ribs on said base spacing the ends of said bus bars apart and projecting above the upper surface of said base to form positioning studs for a coöperating outlet fitting, in combination with a coöperating fitting adapted to rest upon said base and having recesses in its juxtaposed face to receive said positioning studs, outlet terminals on said coöperating fitting, and screws mechanically and electrically connecting the latter to the bus bars.

5. A fitting for an outlet box having upstanding posts and box wall sections surrounding said posts and secured thereto, said fitting comprising an insulating base adapted to rest upon the wall of the box, a boss on said base projecting into the box and provided with bays to accommodate the posts of the box wall, said base being pierced at opposite bays to permit securing screws to pass therethrough into said posts, and having a central wiring aperture together with ledges on opposite sides of said aperture, and bus bars secured on said ledges and a plurality of wire terminal binding screws carried by each bus bar, and ribs on said base spacing the ends of said bus bars apart and projecting above the upper surface of said base to form positioning studs for a coöperating outlet fitting, in combination with a coöperating fitting adapted to rest upon said base and having recesses in its juxtaposed face to receive said positioning studs, together with screws piercing said coöperating fitting from the outer face thereof and engaging said bus bars to mechanically and electrically connect therewith, outlet terminals on said coöperating fitting, and electrical connections between said screws and terminals.

In testimony whereof I have signed my name to this specification.

GEORGE B. THOMAS.